US007620099B2

(12) United States Patent
Hahm et al.

(10) Patent No.: US 7,620,099 B2
(45) Date of Patent: Nov. 17, 2009

(54) WCDMA TERMINAL BASEBAND PROCESSING MODULE HAVING MULTI-PATH SCANNER MODULE

(75) Inventors: Mark David Hahm, Hartland, WI (US); Baoguo Yang, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 662 days.

(21) Appl. No.: 11/216,449

(22) Filed: Aug. 31, 2005

(65) Prior Publication Data

US 2007/0025429 A1 Feb. 1, 2007

Related U.S. Application Data

(60) Provisional application No. 60/703,105, filed on Jul. 28, 2005.

(51) Int. Cl.
*H04B 1/00* (2006.01)
(52) U.S. Cl. .................. 375/150; 375/142; 375/144; 375/147; 375/148; 375/149; 375/316; 375/317; 375/324; 375/325; 375/349
(58) Field of Classification Search ............... 375/142, 375/144, 147–150, 316–317, 324–325, 349
See application file for complete search history.

(56) References Cited

U.S. PATENT DOCUMENTS

| 6,044,104 A * | 3/2000 | Watanabe | 375/142 |
| 6,795,422 B2 * | 9/2004 | Ohsuge | 370/342 |
| 6,934,553 B2 * | 8/2005 | Kuroiwa et al. | 455/500 |
| 7,072,318 B2 * | 7/2006 | Shoji et al. | 370/335 |
| 7,072,383 B2 * | 7/2006 | Saito et al. | 375/148 |
| 7,088,696 B1 * | 8/2006 | Kawabe et al. | 370/335 |
| 7,142,586 B2 * | 11/2006 | Reial | 375/148 |

(Continued)

FOREIGN PATENT DOCUMENTS

CN 1315792 10/2001

(Continued)

OTHER PUBLICATIONS

Harju, et al., "Flexible Implementation of a WCDMA Rake Receiver", IEEE Workshop on Signal Processing Systems, 2002 (SIPS '02), Oct. 16-18, 2002, pp. 177-182.

(Continued)

*Primary Examiner*—Mohammad H Ghayour
*Assistant Examiner*—Sophia Vlahos
(74) *Attorney, Agent, or Firm*—Garlick Harrison & Markison; Bruce E. Garlick; Shayne X. Short

(57) ABSTRACT

A baseband processing module according to the present invention includes a multi-path scanner module. The multi-path scanner module is operable to receive timing and scrambling code information regarding an expected multi-path signal component of a WCDMA signal. Then, the multi-path scanner module is operable to identify a plurality of multi-path signal components of the WCDMA signal by descrambling, despreading and correlating a known symbol pattern of/with a baseband RX signal within a search window. The multi-path scanner module is operable to determine timing information for the plurality of multi-path signal components of the WCDMA signal found within the search window and to pass this information to a coupled rake receiver combiner module.

16 Claims, 17 Drawing Sheets

U.S. PATENT DOCUMENTS

| | | | |
|---|---|---|---|
| 7,292,548 B2 * | 11/2007 | Lim et al. | 370/328 |
| 7,308,017 B2 | 12/2007 | Jiang et al. | |
| 7,394,801 B2 * | 7/2008 | Lin | 370/350 |
| 2002/0034944 A1 * | 3/2002 | Tanno et al. | 455/434 |
| 2002/0131382 A1 * | 9/2002 | Kim et al. | 370/335 |

FOREIGN PATENT DOCUMENTS

| | | |
|---|---|---|
| CN | 1318920 | 10/2001 |
| WO | 03/069793 A1 | 8/2003 |
| WO | WO 03/069793 A1 | 8/2003 |

OTHER PUBLICATIONS

Harju, et al., "Flexible Implementation of a WCDMA Rake Receiver", The Journal of VLSI Signal Processing, Dec. 7, 2004, pp. 147-160, vol. 39.

Harju, et al., "A Baseband Receiver Architecture for UMTS-WLAN Interworking Applications", IEEE Ninth International Symposium on Proceedings Computers and Communications, Jun. 28-Jul. 1, 2004, pp. 678-685, vol. 2.

* cited by examiner

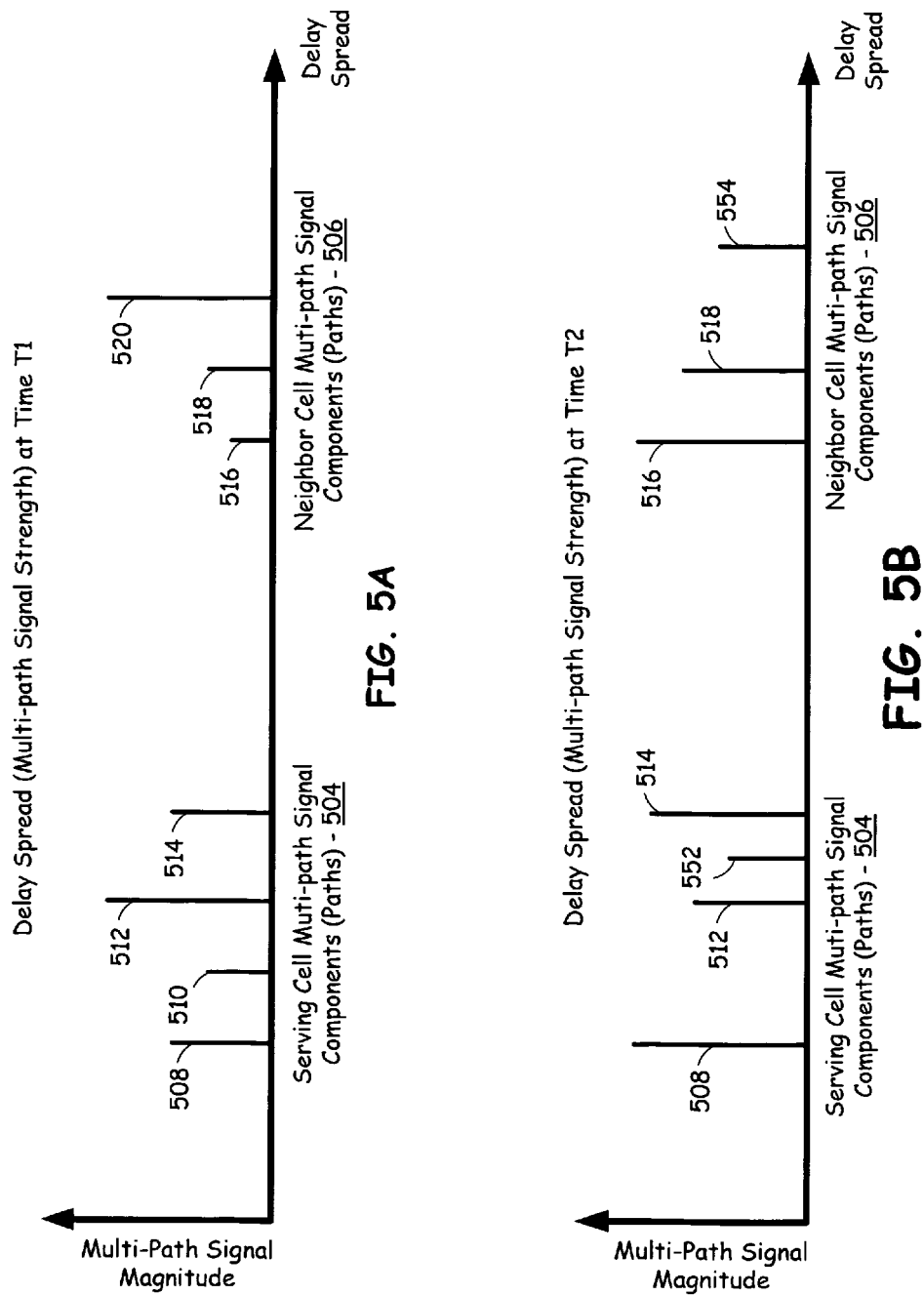

WCDMA TERMINAL BASEBAND PROCESSING MODULE HAVING MULTI-PATH SCANNER MODULE

CROSS REFERENCE TO RELATED APPLICATION

This application claims priority to U.S. Provisional Patent Application Ser. No. 60/703,105, filed Jul. 28, 2005, which is incorporated herein by reference for all purposes.

BACKGROUND

1. Technical Field

The present invention relates generally to wireless communication systems; and more particularly to the decoding of data communications received by a wireless terminal in such a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link"transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standards employ CDMA principles and support high throughput, both voice and data. As contrasted to the North American CDMA standards, transmissions within a UMTS/WCDMA system are not aligned to a timing reference, i.e., GPS timing reference. Thus, synchronization to a base station by a wireless terminal is more complicated in a WCDMA system than in a North American CDMA system. Cell searching, base station identification, and base station synchronization consumes significant processing resources. Such continuous operations can overload a baseband processor causing degradation of performance and decrease battery life.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5A is a graph illustrating an example of a multi-path delay spread at a first time;

FIG. 5B is a graph illustrating the example of the multi-path delay spread of FIG. 5B at a second time;

DETAILED DESCRIPTION OF THE DRAWINGS

Figure 1:
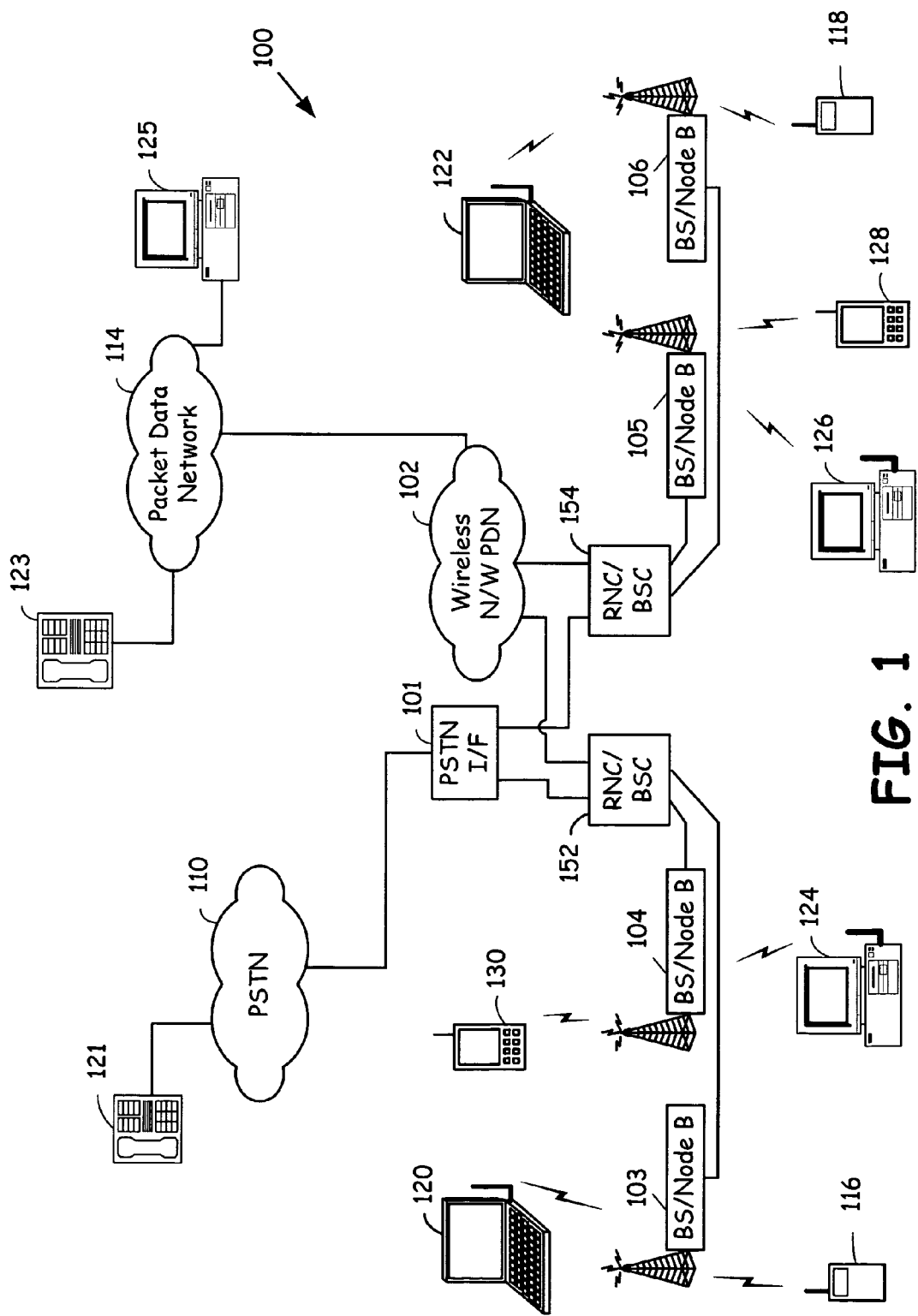
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, and/or the GSM standards.

Figure 2:
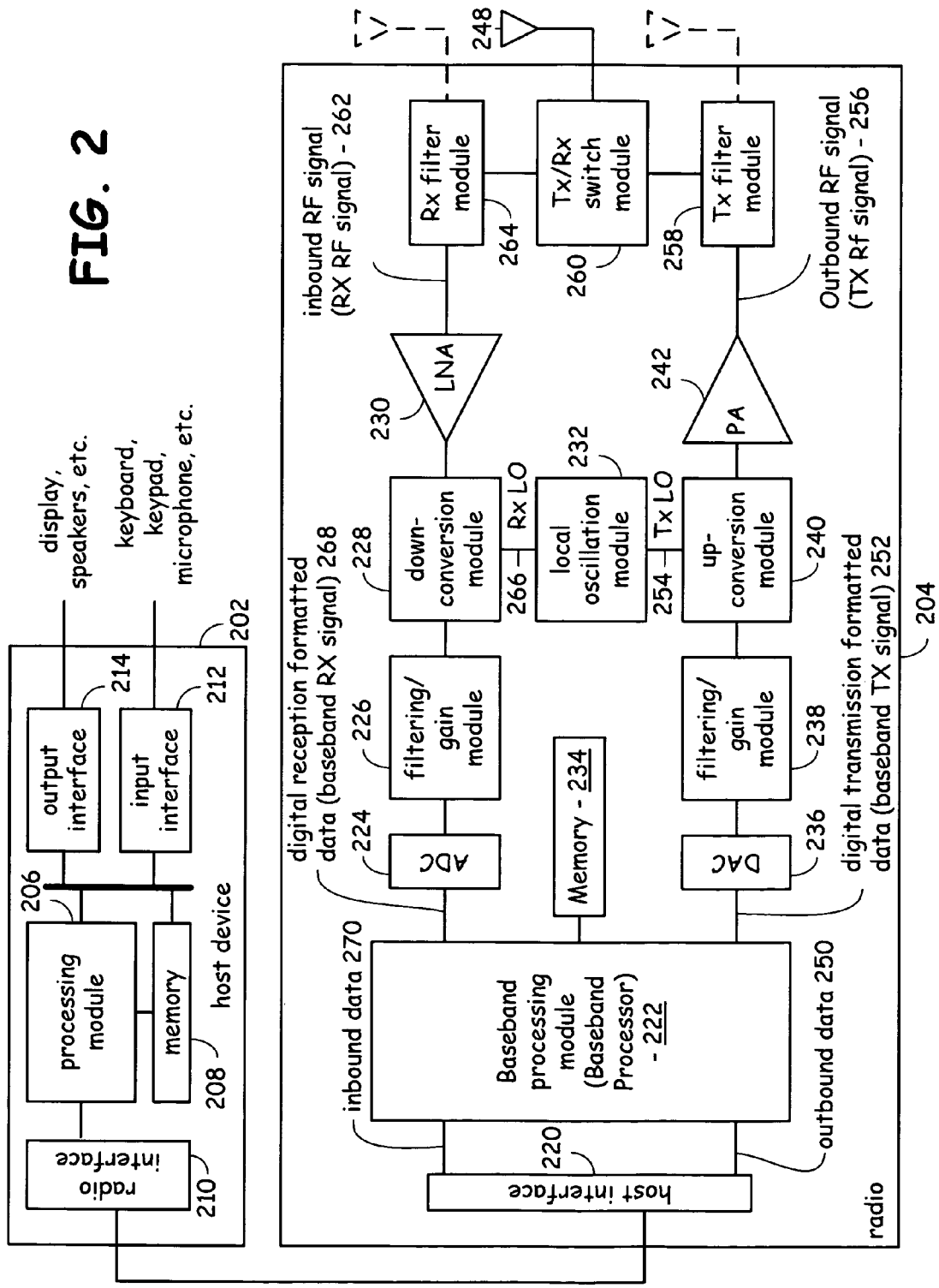
FIG. 2 is a block diagram functionally illustrating a wireless terminal constructed according to the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, reside be house separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding,. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
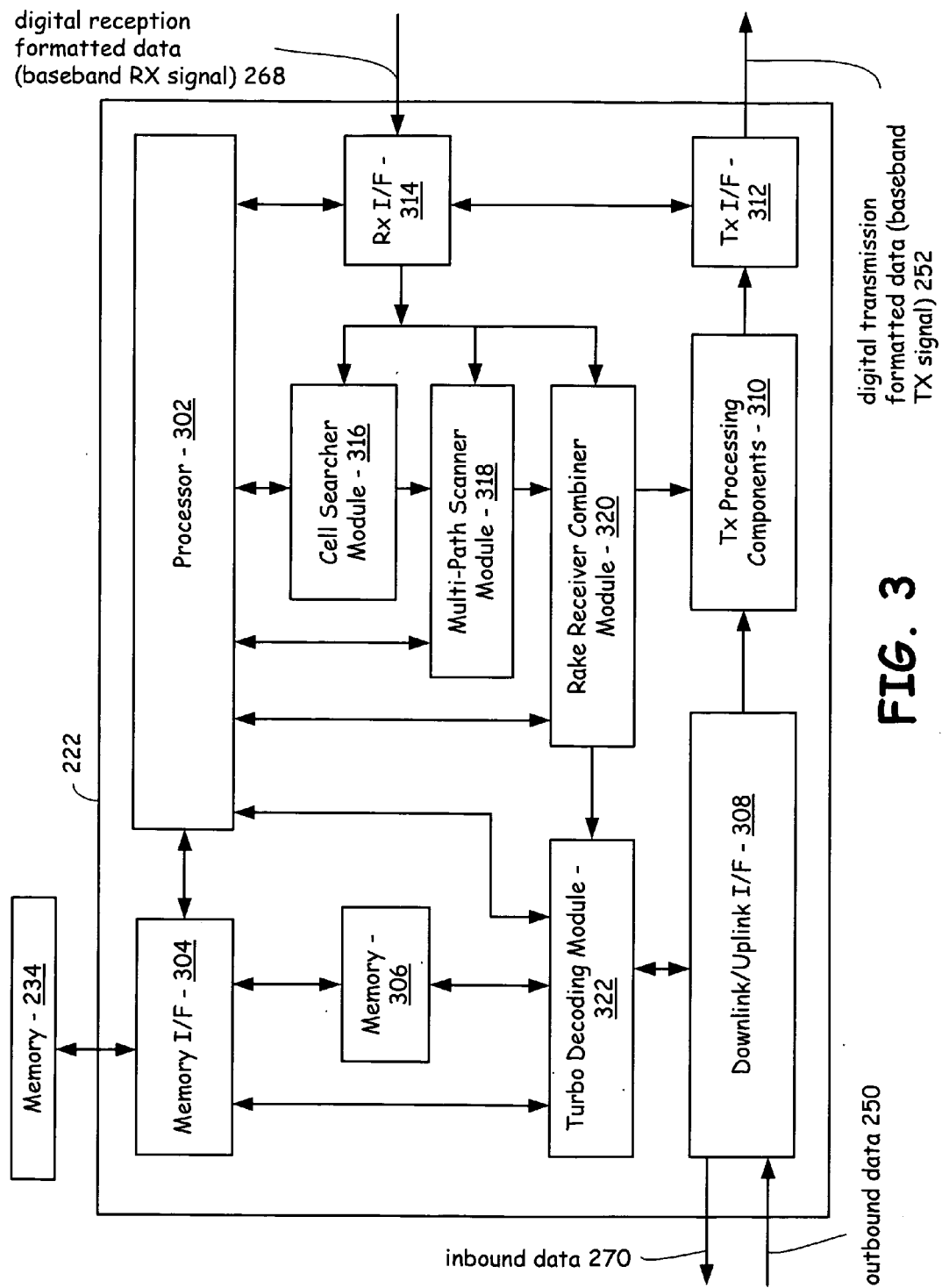
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module 222 (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a rake receiver combiner module 320, and a turbo decoding module 322. The baseband processing module 222 couples in some embodiments to external memory 234. However, in other embodiments, memory 306 services the memory requirements if the baseband processing module 222 302.

As was previously described with reference to FIG. 2, the baseband processing module 222 receives outbound data 250 from coupled host processing components 202 and provides inbound data 270 to the coupled host processing components 202. The baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

The downlink/uplink interface 308 is operable to receive the outbound data 250 from coupled host processing components, e.g., the host processing component 202 via host interface 220. The downlink/uplink interface 308 is operable to provide inbound data 270 to the coupled host processing components 202 via the host interface 220. As the reader will appreciate, the baseband processing module 222 may be formed on a single integrated circuit with the other components of radio 204. Alternately, the radio 204 (including the baseband processing module 222) may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing constructs integrated circuit constructs are possible without departing from the teachings of the present invention. TX processing component 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

Figure 4A:
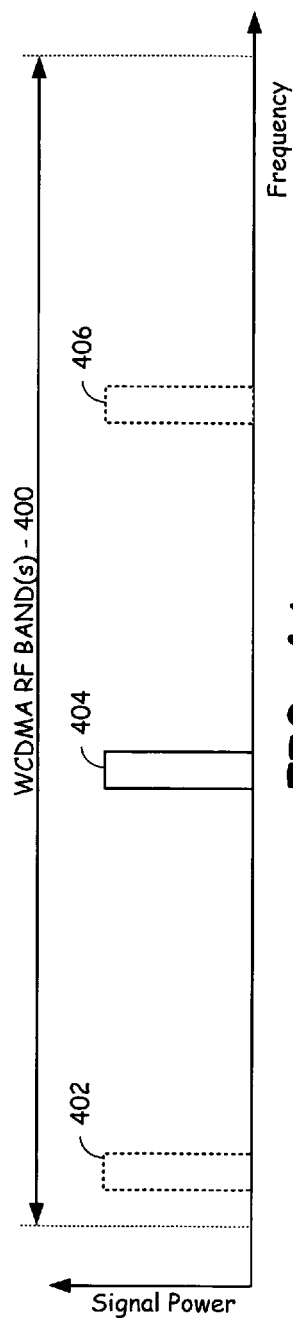
FIG. 4A is a graph illustrating diagrammatically the power spectral density of WCDMA RF band(s) supporting multiple RF carriers.

FIG. 4A is a graph illustrating diagrammatically the power spectral density of WCDMA RF band(s) 400 supporting multiple RF carriers 402, 404, and 406. The WCDMA RF band(s) 400 extend across a frequency spectrum and include WCDMA RF carriers 402, 404, and 406. According to one aspect of the present invention, the cell searcher module 316 of the baseband processing module 222 of an RF transceiver that supports WCDMA operations according to the present invention is operable to scan the WCDMA RF band(s) 400 to identify WCDMA RF energy of at least one WCDMA carrier 402, 404, or 406. During initial cell search operations, the cell searcher module 316 will, in combination with other components of the baseband processing module 222, identify a strongest WCDMA carrier, e.g., 404. Then, the cell searcher module 316 synchronizes to WCDMA signals within the WCDMA carrier 404. These WCDMA signals corresponding to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 404. Alternately, the WCDMA signals from differing base stations/sectors may use differing WCDMA carriers, e.g., 402 or 406. According to the present invention, the cell searcher module 316 and the baseband processing module 222 are operable to synchronize to WCDMA signals from differing cells/sectors operating in one or more of the WCDMA RF bands 402, 404, or 406. Such synchronization operations occur not only for initial cell search but for neighbor cell search or detected cell search operations. The reader should note that the WCDMA RF bands 402, 404, and 406 are not shown as being adjacent in FIG. 4A. Of course, in many systems, WCDMA RF bands may reside adjacent one another with a required channel separation.

Figure 4B:
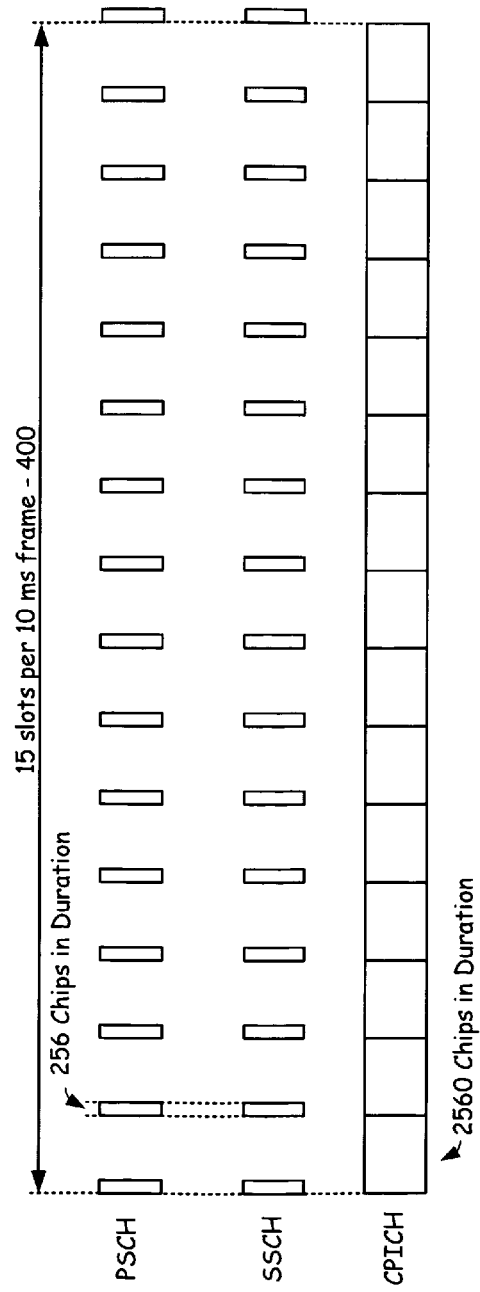
FIG. 4B is a block diagram diagrammatically illustrating the timing of various channels of a WCDMA system employed for cell searching and base station synchronization according to the present invention.

FIG. 4B is a block diagram diagrammatically illustrating the timing of various channels of a WCDMA system employed for cell searching and base station synchronization according to the present invention. The WCDMA signal illustrated has a 15 slot frame structure that extends across 10 ms in time. The WCDMA signal includes a Synchronization Channel (SCH) and a Common Pilot Channel (CPICH), which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear $\frac{1}{10}$ of each time slot. The rest of time slot is Common Control Physical Channel (CCPCH). As shown in FIG. 4A, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group). The CPICH carries pre-defined symbols with a fixed rate (30 kbps, hence 10 symbols per time slot) and spreading factor of 256. The channelization code for CPICH is fixed to the $0^{th}$ code.

According to the present invention, the cell searcher module 316 of the baseband processing module 222 of a WCDMA RF transceiver are operable to: (1) scan for WCDMA energy within a baseband RX signal received at the RX interface corresponding to the WCDMA signal; (2) acquire a slot synchronization to the WCDMA signal based upon correlation with the PSCH of the WCDMA signal; (3) acquire frame synchronization to, and identify a code group of, the received WCDMA signal based upon correlation with the SSCH of the WCDMA signal; and (4) identify the scrambling code of the WCDMA signal based upon correlation with the CPICH of the WCDMA signal.

FIG. 5A is a graph illustrating an example of a multi-path delay spread at a first time, T1. As is known, in wireless communication systems, a transmitted signal may take various routes in propagating from an RF transmitter to an RF receiver. Referring briefly again to FIG. 1, transmissions from base station 103 to wireless terminal 116 may take multiple paths with each of these multiple paths arriving in a corresponding time frame. These multiple received copies of the transmitted signal are typically referred to as "multi-path" signal components. Each multi-path signal component may also be referred to herein as a "path". Referring again to FIG. 5A, an example of a delay spread that includes multi-path signal components and their corresponding signal strength for time T1 is shown.

Serving cell multi-path signal components 504 include paths 508, 510, 512, and 514 that are received at respective times with respect to a periodic reference time. Neighbor cell multi-path signal components 506 include paths 516, 518, and 520. Note that the serving cell multi-path signal components 504 and neighbor cell multi-path signal components arrive at differing times with respect to a reference time since they are not time aligned. As is known, multi-path signal components of a transmitted RF signal arrive in a time skewed manner at the RF receiver. As is also known, the number of received multi-path signal components and the signal strength and signal to interference ratio of each multi-path signal component varies over time.

FIG. 5B is a graph illustrating the example of the multi-path delay spread of FIG. 5A at a second time, T2. Because the characteristics of the channel from the RF transmitter to the RF receiver changes over time, so does the serving cell multi-path signal components 504 and neighbor cell multi-path signal components 506. Thus, for example, the path 508 of FIG. 5B, while having the same time relationship to the periodic reference time as path 508 as shown in FIG. 5A, has a greater signal-to-interference ratio or signal-to-noise ratio than it did in FIG. 5A. Further, path 510 is missing, path 512 is smaller in magnitude, and path 514 is greater in magnitude than are their counterparts of FIG. 5B. In addition, serving cell multi-path signal components 504 include a path 552 that is existent at time T2 but it was not existent at time T1.

The neighbor cell multi-path signal components 506 at time T2 of FIG. 5B also differ from those at time T1 of FIG. 5A. In such case, multi-path signal components 516 and 518 have differing magnitudes at time T2 than they did at time T1. Further, multi-path signal component 520 which was strong at time T1 does not exist at time T2. Moreover, new multi-path signal component 554 at time T2 exists where it did not exist at time T1. The cell searcher module 316, multi-path scanner module 318, and rake receiver module 320 track the existence of these multi-path signal components, synchronize to some of these multi-path signal components, and receive data via at least some of these multi-path signal components.

Figure 6:
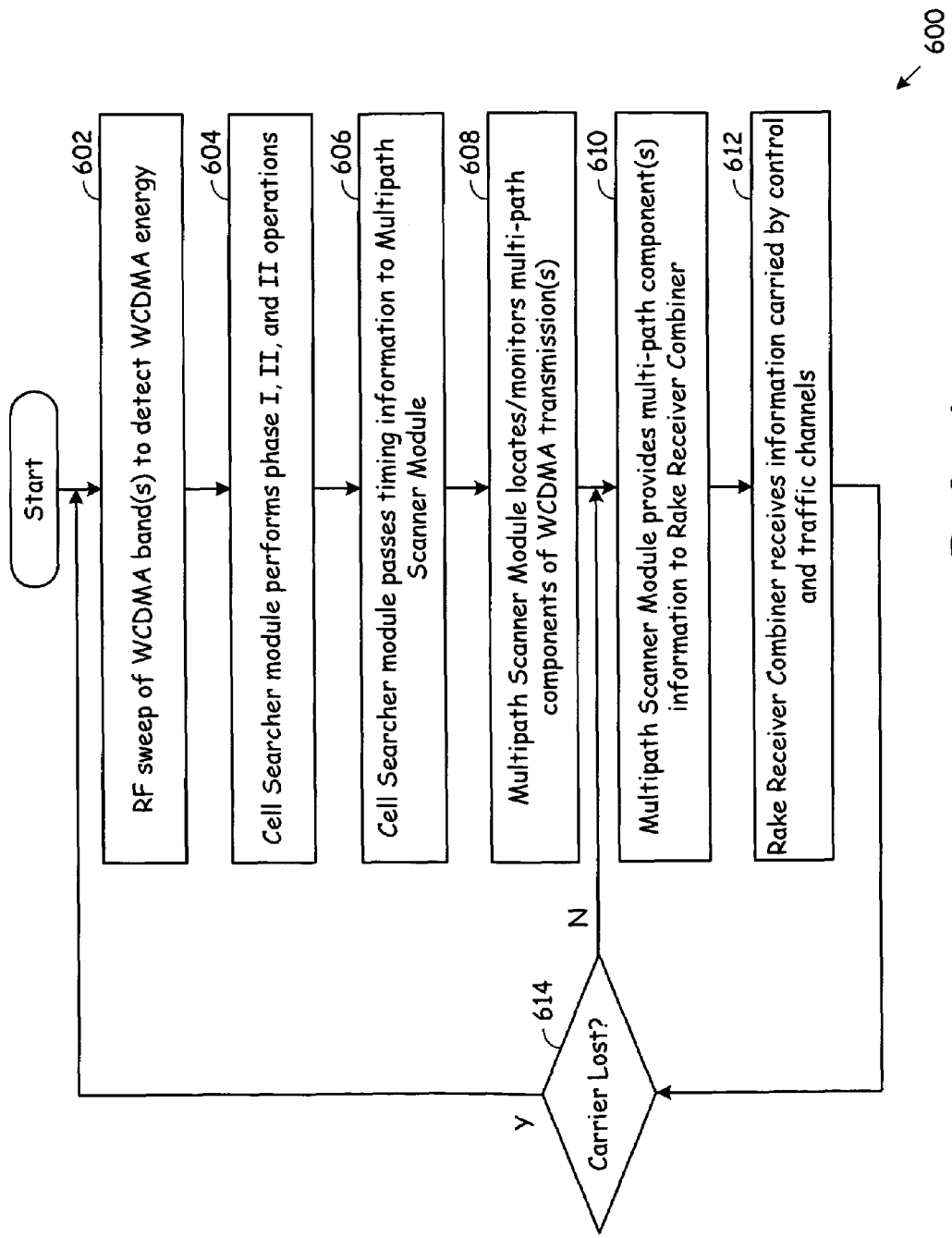
FIG. 6 is a flow chart illustrating operations of a wireless terminal in searching for, finding, synchronizing to, and receiving data from a base station according to an embodiment of the present invention.

FIG. 6 is a flow chart illustrating operations of a wireless terminal in searching for, finding, synchronizing to, and receiving data from a base station according to an embodiment of the present invention. The operations 600 of FIG. 6 are performed by the cell searcher module 316, the multi-path scanner module 318, and the rake receiver module 320 of the baseband processing module 222 of the radio 204 of a wireless terminal constructed according to the present invention. The operations 600 are initiated upon start-up or reset or when the RF terminal is otherwise detecting a serving cell within a WCDMA system and continue during operation of the radio 204 of the wireless terminal. Operation commences with the RF transceiver performing an RF sweep of WCDMA RF bands to detect WCDMA energy (Step 602). The RF sweep of the WCDMA RF bands is a collective effort between the RF front-end components of the RF transceiver radio 204 shown in FIG. 2 as well as the baseband processing module 222 of the radio 204 of FIG. 2. Referring to FIG. 6 and FIG. 3 jointly, in making the RF sweep of the WCDMA RF bands to detect WCDMA energy, the RF front-end tunes to various RF channels within the WCDMA RF bands 400 as shown and discussed with reference to FIG. 4A. With particular references to the components of the baseband processing module 222, the cell searcher module 316 may interact with the processor 302 in order to detect WCDMA energy during the RF sweep of the WCDMA RF bands.

After this RF sweep has been completed at Step 602, the processor 302, in cooperation with the cell searcher module 316 and the RF front-end components, identifies a particular RF band, e.g., 404 of FIG. 4A, in which to detect and synchronize to a WCDMA signal. The cell searcher module 316 of the baseband processing module 222 performs Phase I, Phase II, and Phase III operations in an initial cell search operations (Step 604). In performing its initial cell search operations, the cell searcher module 316 acquires slot synchronization to the WCDMA signal based upon correlation with the PSCH of the WCDMA signal in its Phase I operations. Then, in the Phase II operation, the cell searcher module 316 acquires frame synchronization to, and identifies a code group of, the received WCDMA signal based upon correlation with the SSCH of the WCDMA signal. Then, in its Phase III operations, the cell searcher module 316 identifies the scrambling code of the WCDMA signal based upon correlation with the CPICH of the WCDMA signal. The manner in which the Phase I, II, and III operations of the cell searcher module 316 are performed, and the structured used thereby, is described more fully in co-pending application entitled "WCDMA TERMINAL BASEBAND PROCESSING MODULE HAVING CELL SEARCHER MODULE," filed on Sep. 6, 2005 and having been assigned the Ser. No. 11/221,145. The results of the Phase I, II, and III operations performed by the cell searcher module 316 yield timing information regarding at least one multi-path signal component of the WCDMA signal. In one embodiment, the Phase I, II, and III operations yield timing information and the scrambling code of a strongest multi-path signal component of a WCDMA signal of the selected WCDMA RF carrier.

Operation continues with the cell searcher module 316 passing the timing and scrambling code information to the multi-path scanner module 318 (Step 606). This information may be passed directly or via the processor 302. The multi-path scanner module 318 then locates and monitors multi-path signal components of the WCDMA transmissions (Step 608). The multi-path scanner module 318 then provides the multi-path signal component timing information to the rake receiver combiner module 320 (Step 610). This information may be passed directly or via the processor 302. The rake receiver combiner module 320 then receives information carried by control and traffic channels of the WCDMA signal of the serving cell/sector (Step 612). The RF transceiver continues to receive control and traffic channel information from a serving cell until it decides to either find a new serving cell via neighbor search operations, it loses the signal from the serving cell, or upon another operational determination in which it decides to either terminate receipt of the signal from the serving cell or the carrier is lost. When the signal is lost (Step 614) or in another situation which the RF transceiver decides to move to a different RF carrier, operation proceeds again to Step 602. However, if the RF transceiver determines that continued operation of the particular RF carrier and for the particular serving cell should continue, operation continues to Step 610 again.

Figure 7:
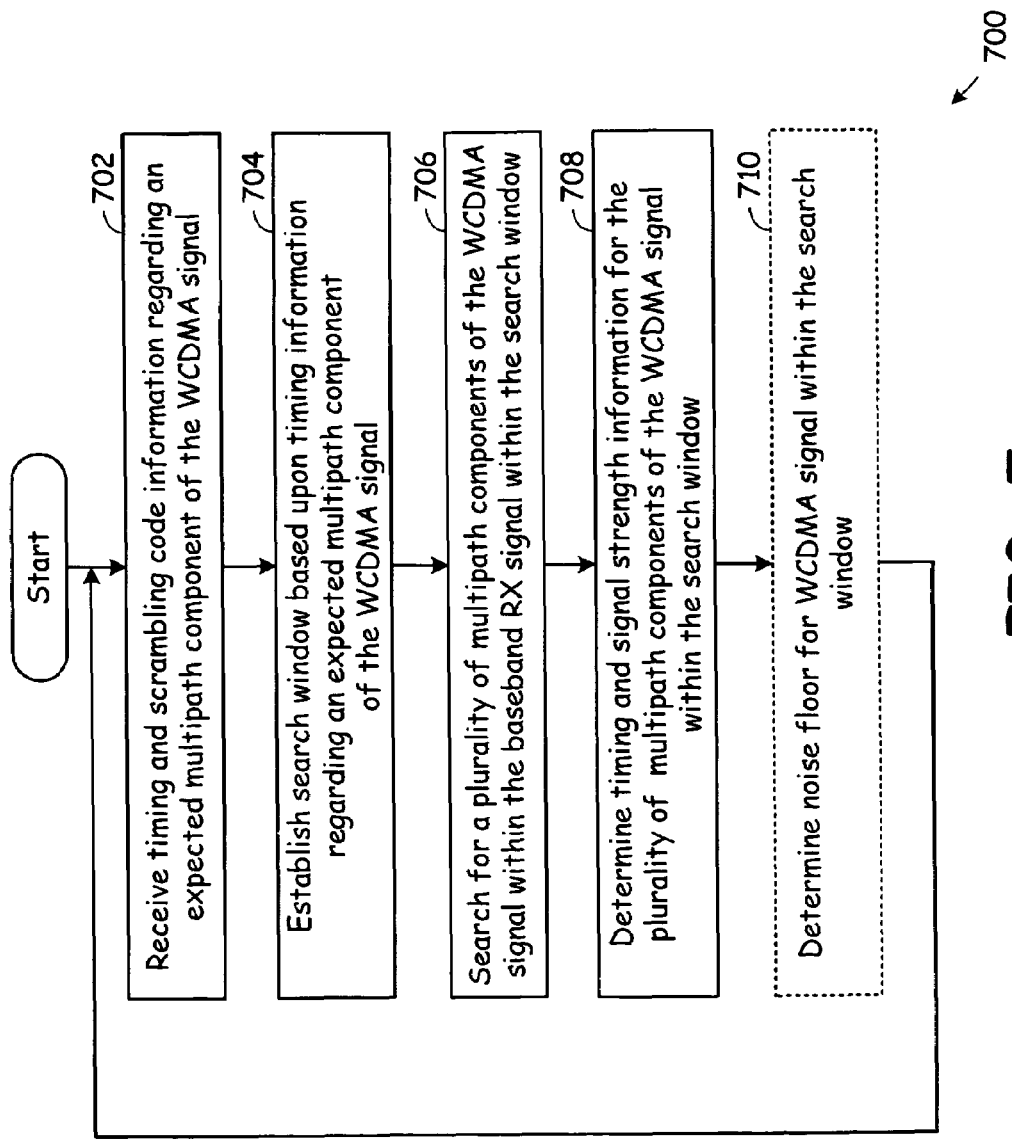
FIG. 7 is a flow chart illustrating operations of a multi-path scanner module according to an embodiment of the present invention.

FIG. 7 is a flow chart illustrating operations of a multi-path scanner module according to an embodiment of the present invention. These operations 700 commence with the multi-path scanner module receiving timing and scrambling code information regarding an expected multi-path signal component of the WCDMA signal (Step 702). This timing and scrambling code information in one operation is received from the cell searcher module 316. After the multi-path scanner module has received the timing and scrambling code information at Step 702, the multi-path scanner module establishes a search window based upon the timing information and regarding an expected multi-path signal component of the WCDMA signal (Step 704). As will be described further with reference to FIG. 8, the multi-path scanner module is interested in searching for multi-path signal components of the WCDMA signal within a search window corresponding to an expected length of the corresponding channel.

Then, the multi-path scanner module 318 searches for a plurality of multi-path signal components of the WCDMA signal within the search window (Step 706). The operations of the multi-path scanner module in searching for these multi-path signal components of the WCDMA signal will be described herein with reference to FIGS. 8-16. In one particular embodiment of the present invention, the multi-path signal components of the WCDMA signals are found by correlating the WCDMA signal within the search window with the expected CPICH channel. The CPICH of the WCDMA signal has a known symbol pattern, has spread using a known PN sequence, and has been scrambled according to the scrambling code received at Step 702. Thus, with all of this information known, the multi-path scanner module 318 may search for the CPICH at all possible alignment positions within the search window. The alignment positions within the search window at which the CPICH is "found" represent the multi-path signal components of the WCDMA signal within the search window.

Then, the multi-path scanner module determines timing and signal path strength information of the plurality of multi-path signal components to the WCDMA signal within the search window (Step 708). Finally, the multi-path scanner module optionally determines the noise floor from the WCDMA signal within the search window (Step 710). Generally, at least one multi-path signal component of the WCDMA signal will appear within the search window. More typically, a plurality of multi-path signal components of the WCDMA signal will appear within the search window, each having a respective timing and signal strength associated therewith. Locations within the search window that do not have paths present represent the noise floor for the search window. Thus, at Step 710, the multi-path scanner module also is able to determine the noise floor when locating multi-path signal components within the search window. From Step 710, operation returns to Step 702. According to the present invention, the multi-path scanner module is operable to search for a WCDMA signal transmitted from one base station cell or sector within each time slot. Thus, the multi-path scanner module can search for different WCDMA signals transmitted from differing base station in adjacent slots. Further, long term timing information may be determined by the multi-path scanner module 318 searching for multi-path signal components of the WCDMA signal in multiple slots and/or slots in multiple frames.

Figure 8:
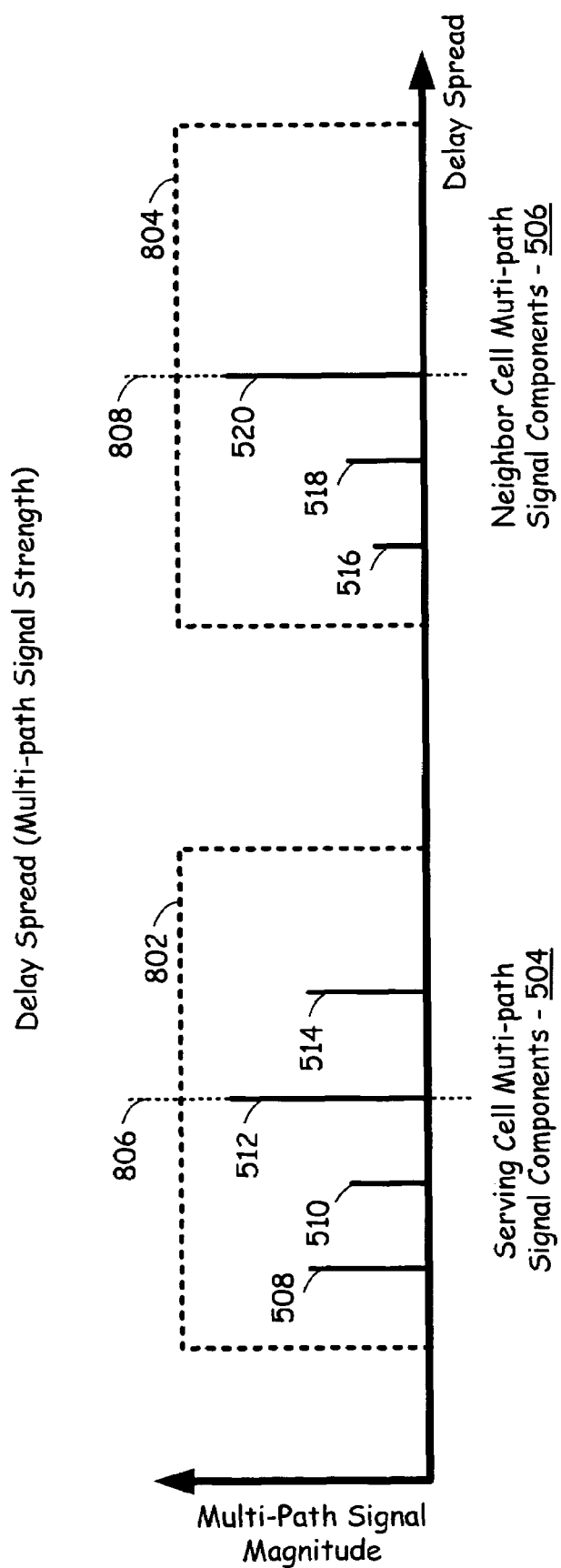
FIG. 8 is a graph illustrating the manner in which a multi-path scanner module establishes a search window according to an embodiment of the present invention.

FIG. 8 is a graph illustrating the manner in which a multi-path scanner module establishes a search window according to an embodiment of the present invention. When the multi-path scanner module searches for multi-path signal components of a serving cell 504, it receives timing information regarding a strongest multi-path signal component for the serving cell 512, e.g., from the cell searcher module 316. Thus, the multi-path scanner module 318 establishes the search window center 806 so that it is time aligned with the strongest multi-path signal component 512. With this alignment of the search window, the multi-path scanner module has a higher degree of certainty in assuring that all potential multi-path signal components are identified. As is shown, with the strongest multi-path signal component 512 of the WCDMA signal located at the center 806 of the search window 802, remaining multi-path signal components of the WCDMA signal 508, 510, and 514 reside within the boundaries of the search window 802. With the center 806 of the search window 802 centered on the strongest multi-path signal component 512, the likelihood of locating all acceptable multi-path signal components of the WCDMA signal is optimized or maximized.

Likewise, when the multi-path scanner module 318 is configured to search for multi-path signal components of the neighbor cell 506, the multi-path scanner module 318 aligns the center 808 of the search window 804 with the strongest multi-path signal component 520 of the neighbor cell. The reader will appreciate that the relative time of receipt of transmissions from differing cells or sectors will arrive at the RF transceiver of the present invention with different relative timings. Thus, according to the present invention, the multi-path scanner module adjusts the alignment of the search window based upon the timing information regarding the expected multi-path signal component of the WCDMA signal as received at Step 702 of FIG. 7.

Figure 9:
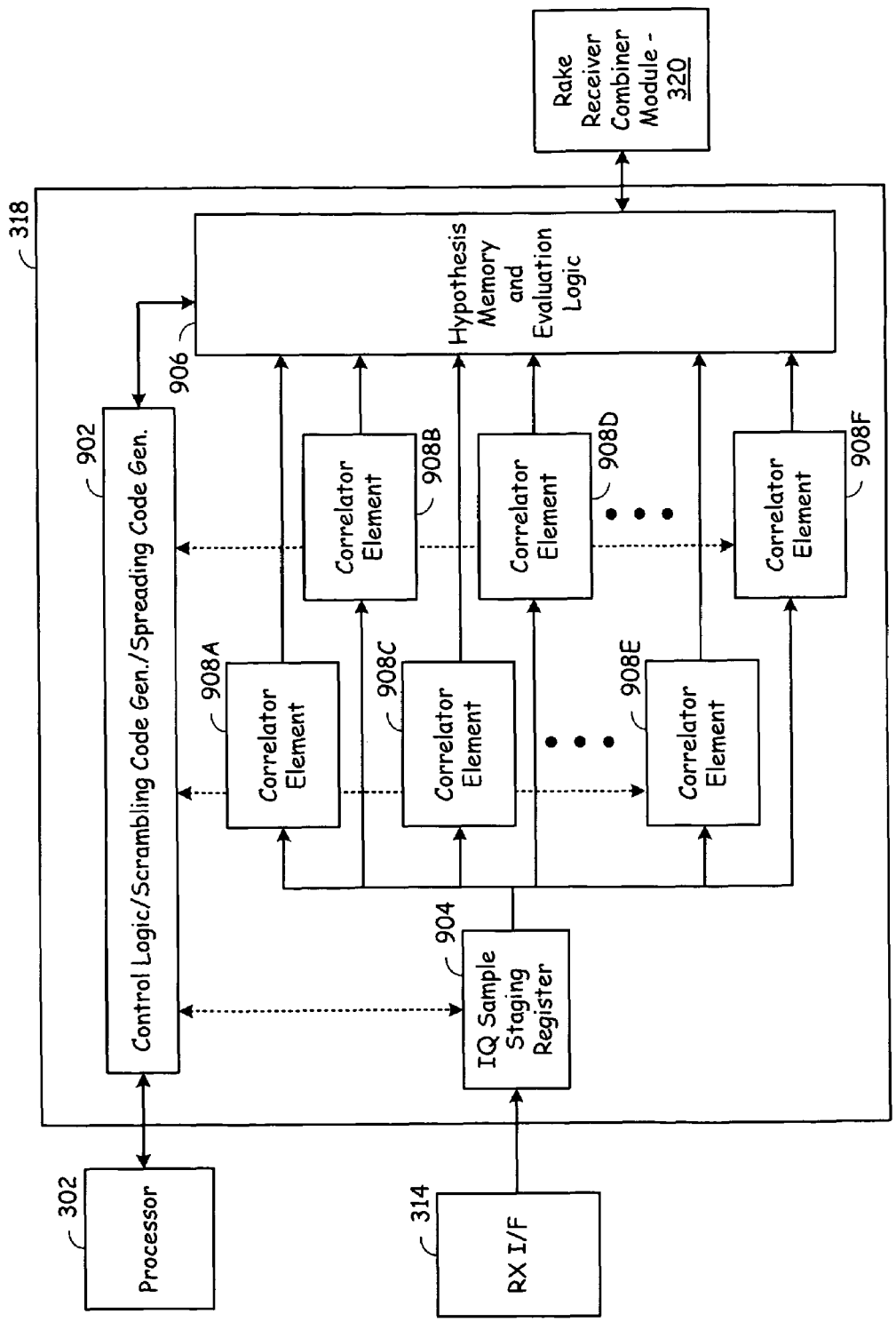
FIG. 9 is a block diagram illustrating components of a multi-path scanner module according to an embodiment of the present invention.

FIG. 9 is a block diagram illustrating components of a multi-path scanner module according to an embodiment of the present invention. The structure of the multi-path scanner module 318 illustrated in FIG. 9 is only one example of the multi-path scanner module 318 of the present invention. The multi-path scanner module 318 couples to processor 302, RX interface 314, and rake receiver module 320 as was previously illustrated with reference to FIG. 3. However, the multi-path scanner module 318 may couple to other components of the baseband processing module of the RF transceiver of the present invention as well. The multi-path scanner module includes control logic 902, at least one correlator element 908A-908F, an IQ sample staging register 904, and hypotheses memory and evaluation logic 906.

The control logic 902 is operable to control each of the other elements of the multi-path scanner module 318, to generate one or more scrambling codes used by the correlator elements 908A-908F, and to generate spreading codes (PN codes/sequences) used by the correlator elements 908A-908F. Each of the correlator elements 908A-908F is operable to descramble, despread, and correlate with a known symbol pattern the baseband RX signal, e.g., CPICH, for a corresponding alignment position within the search window. The manner in which each correlator element performs its operations and how its operations relate to assigned alignment positions will be described further with reference to FIG. 10.

Figure 10:
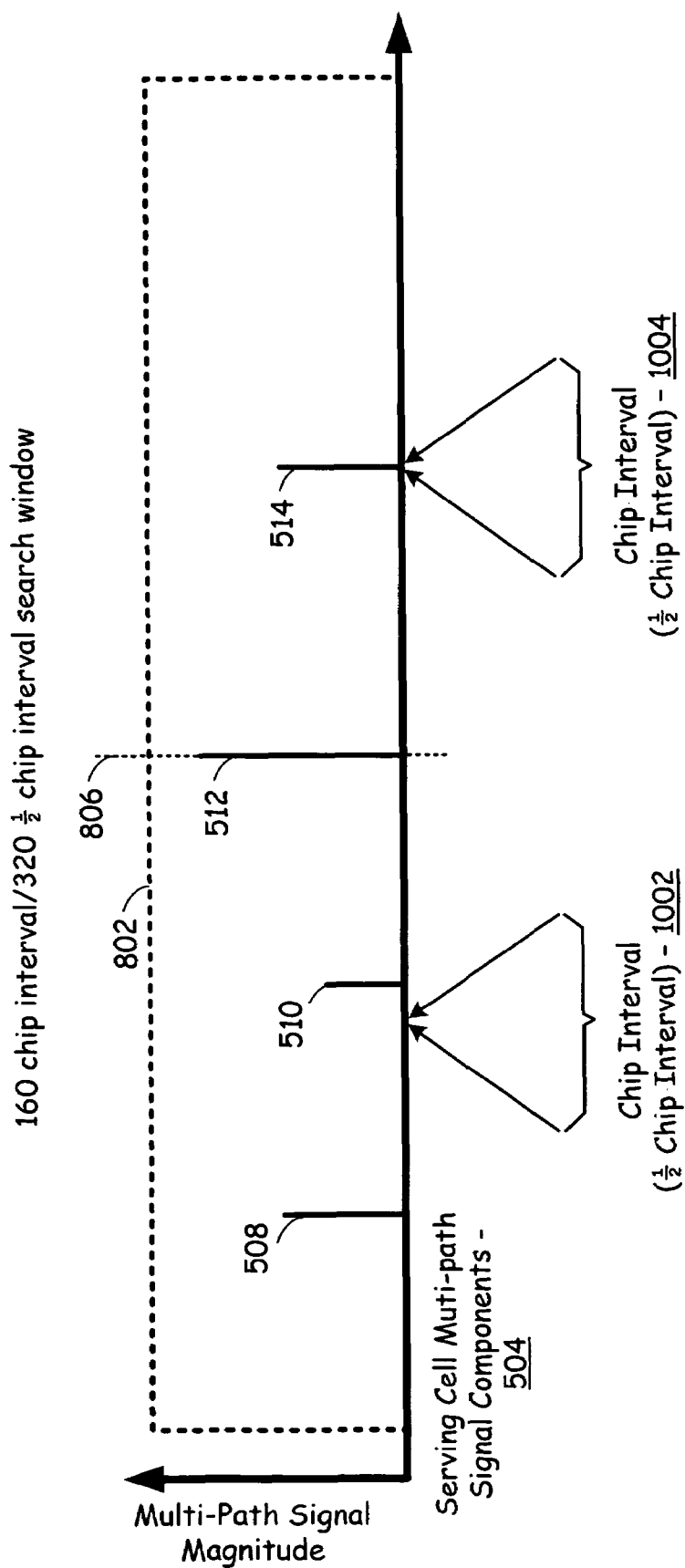
FIG. 10 is a graph illustrating the manner in which a multi-path scanner module correlates to a baseband RX signal within a search window according to the present invention.

FIG. 10 is a graph illustrating the manner in which a multi-path scanner module correlates to a baseband RX signal within a search window according to the present invention. Generally, the number of correlator elements of the multi-path scanner module 318 is in direct relationship to the number of possible alignment positions. Thus, for example, referring to FIG. 10, when the search window extends across a 160 chip interval, at least 160 correlator elements are required for correlation. However, when the search window 802 is subdivided into ½ chip intervals, 320 alignment positions result and 320 separate correlator elements are required for correlation. The example in FIG. 10 shows chip intervals 1002 and 1004 each of which corresponds to an alignment position. Further, when the alignment positions each correspond to ½ chip intervals, the width of each alignment position relates to a ½ chip width. While a minimum resolution requirement is the one chip level, a half chip interval provides additional precision in locating multi-path signal components of the WCDMA signal, e.g., multi-path signal component 508, 510, 512, and 514.

Referring again to FIG. 9, the multi-path scanner module 318 may include correlator elements for each alignment position within the search window. Alternatively, the multi-path scanner module 318 may assign/reassign correlator elements among multiple alignment positions. In such case, complete correlation operations for one alignment position are performed by the correlator element and then complete correlation operations are performed for another alignment position by a single correlator element. The reader will appreciate that this parallel and time shared operation may be extended to more than two alignment positions being serviced by a single correlator element.

Figure 11A:
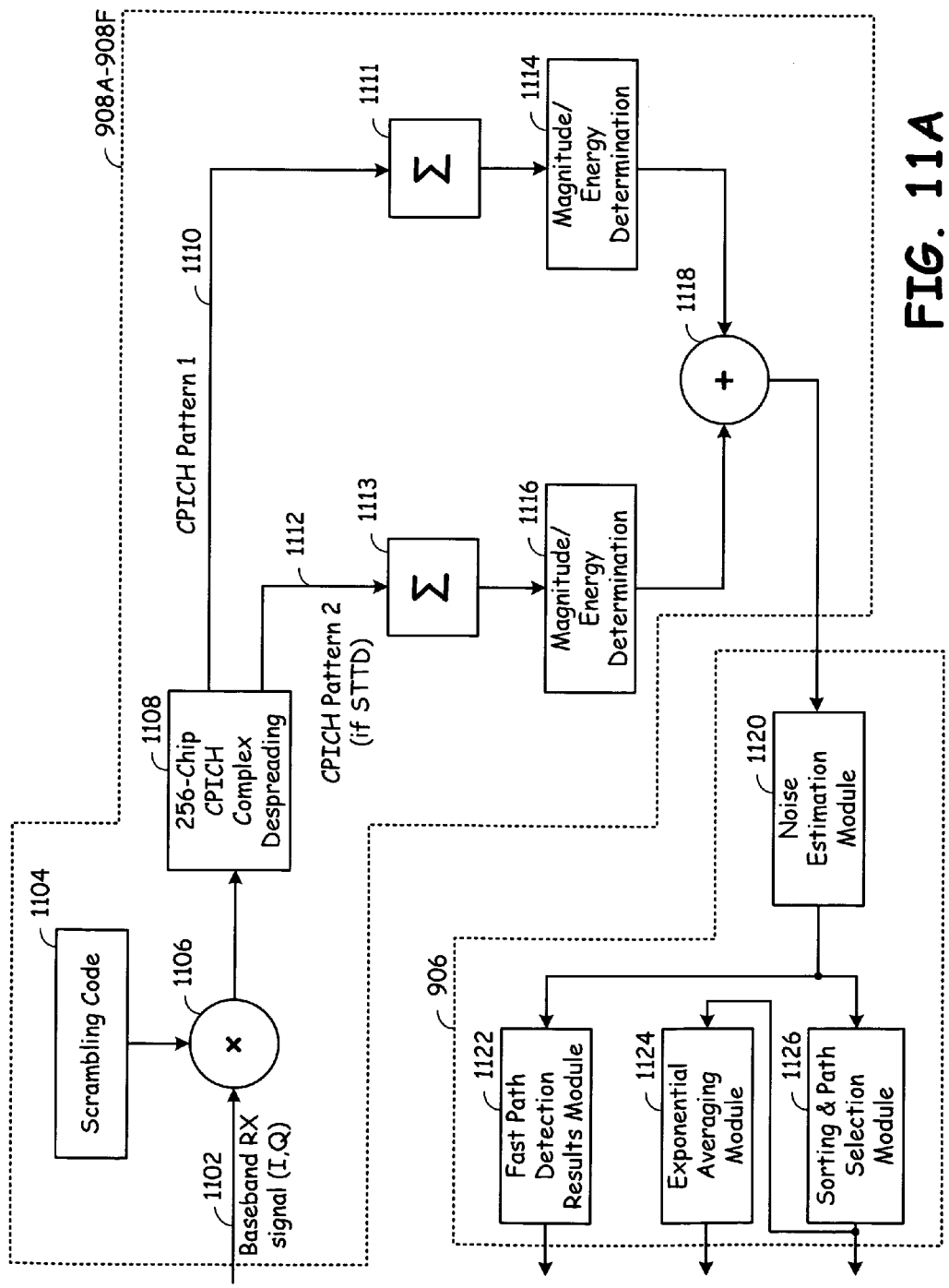
FIG. 11A is a block diagram illustrating a correlator element of a multi-path scanner module according to an embodiment of the present invention.

FIG. 11A is a block diagram illustrating a correlator element of a multi-path scanner module according to an embodiment of the present invention. Correlator elements 908A-908F receive a baseband RX signal 1102 having both I & Q components. The correlator element includes a mixer block 1106 that mixes the identified scrambling code 1104 with the baseband RX signal 1102. The output of the mixer 1106 is provided to a 256 chip CPICH complex despreading block 1108 that produces CPICH pattern 1 1110. When transmit diversity operations are employed, the 256 chip CPICH complex despreading block also produces a CPICH pattern 2 1112. CPICH pattern 1 1110 is accumulated by accumulator block 1111. Further, the CPICH pattern 2 1112 is accumulated by accumulator block 1113. Magnitude/energy determination blocks 1114 and 1116 receive the outputs of accumulator blocks 1111 and 1113, respectively, and determine the magnitude or energy, or approximation thereof of the input. The outputs of the magnitude/energy determination blocks 1114 and 1116 are summed via summing block 1118 and output to noise estimation module 1120. The noise estimation module 1120, a fast path detection results module 1122, an exponential averaging module 1124, and a sorting & path selection module 1128 may reside within the hypotheses memory and evaluation logic 906 of FIG. 9. Alternatively, these elements 1120, 1122, 1124, and 1126 may be partially enabled by the control logic 902 of FIG. 9. The output of the noise estimation module 1120 is provided to the fast path detection results module 1122 and the sorting & path selection module 1126. The output of the sorting & path selection module 1126 is provided to the exponential averaging module 1124. The operations of these modules will be described further with reference to FIGS. 12-16.

Figure 11B:
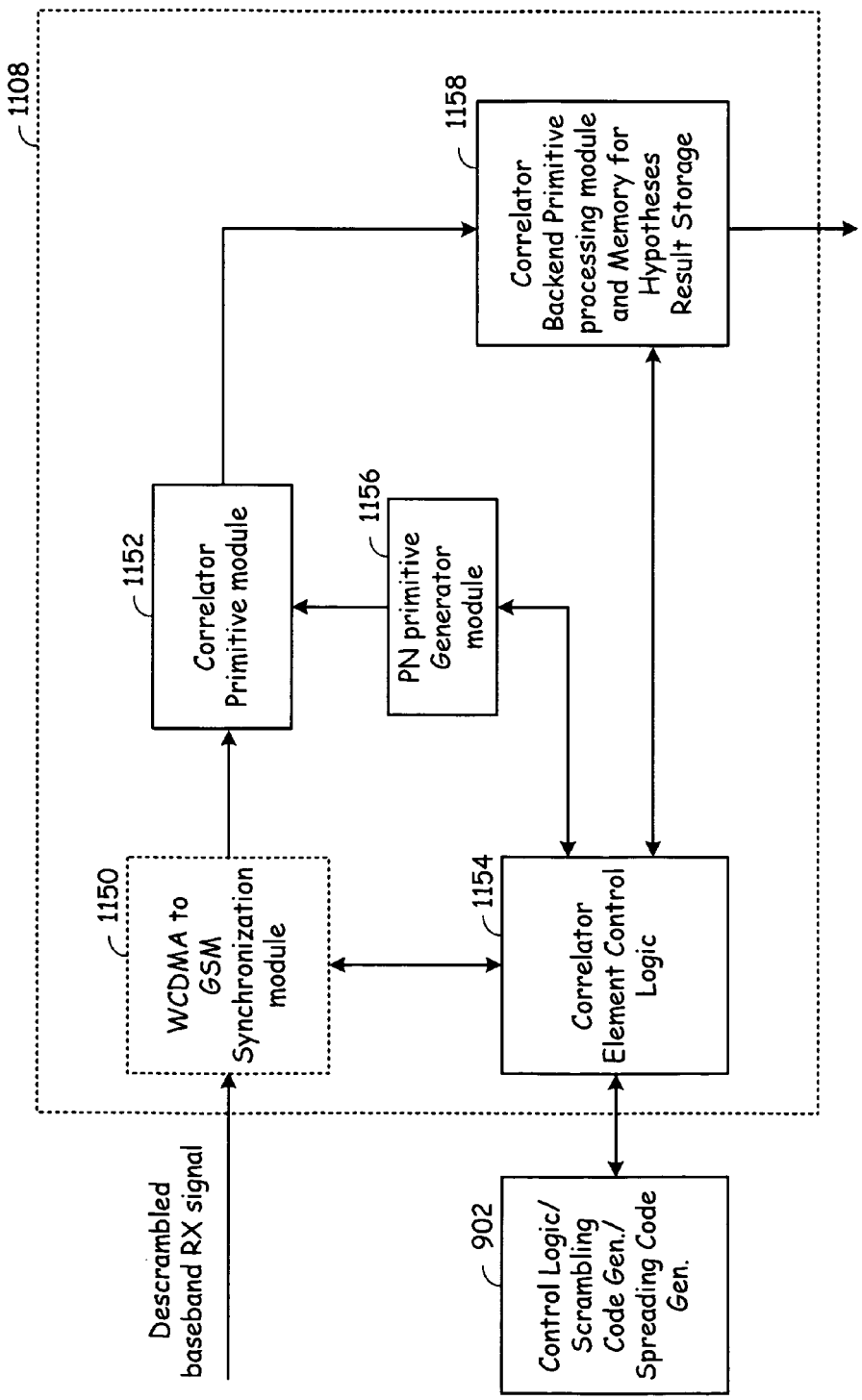
FIG. 11B is block diagram illustrating components of a correlator element of a multi-path scanner module according to an embodiment of the present invention.

FIG. 11B is block diagram illustrating components of a correlator element of a multi-path scanner module according to an embodiment of the present invention. As shown in FIG. 11B, the 256 chip CPICH complex despreading block 1108 includes a correlator primitive module 1152, a PN primitive generator module 1156, correlator element control logic 1154, correlator backend primitive processing module and memory for hypotheses result storage 1158, and may include a WCDMA to GSM synchronization module 1150. The correlator primitive module 1152 performs correlation operations on the descrambled baseband RX signal after it has optionally been synchronized by the WCDMA to GSM synchronization module 1150. The correlator primitive module 1152 receives a PN primitive produced by the PN primitive generator module 1156. The results of the correlator primitive module 1152 are received and processed over time with the correlator backend primitive processing module and stored in the memory for hypotheses result operations. The correlator element control logic 1154 controls the operations of the block within the CPICH complex despreading block 1108.

Coupled to the correlator element control logic 1154 is the control logic/scrambling code generation/spreading code generation block 902.

Figure 12:
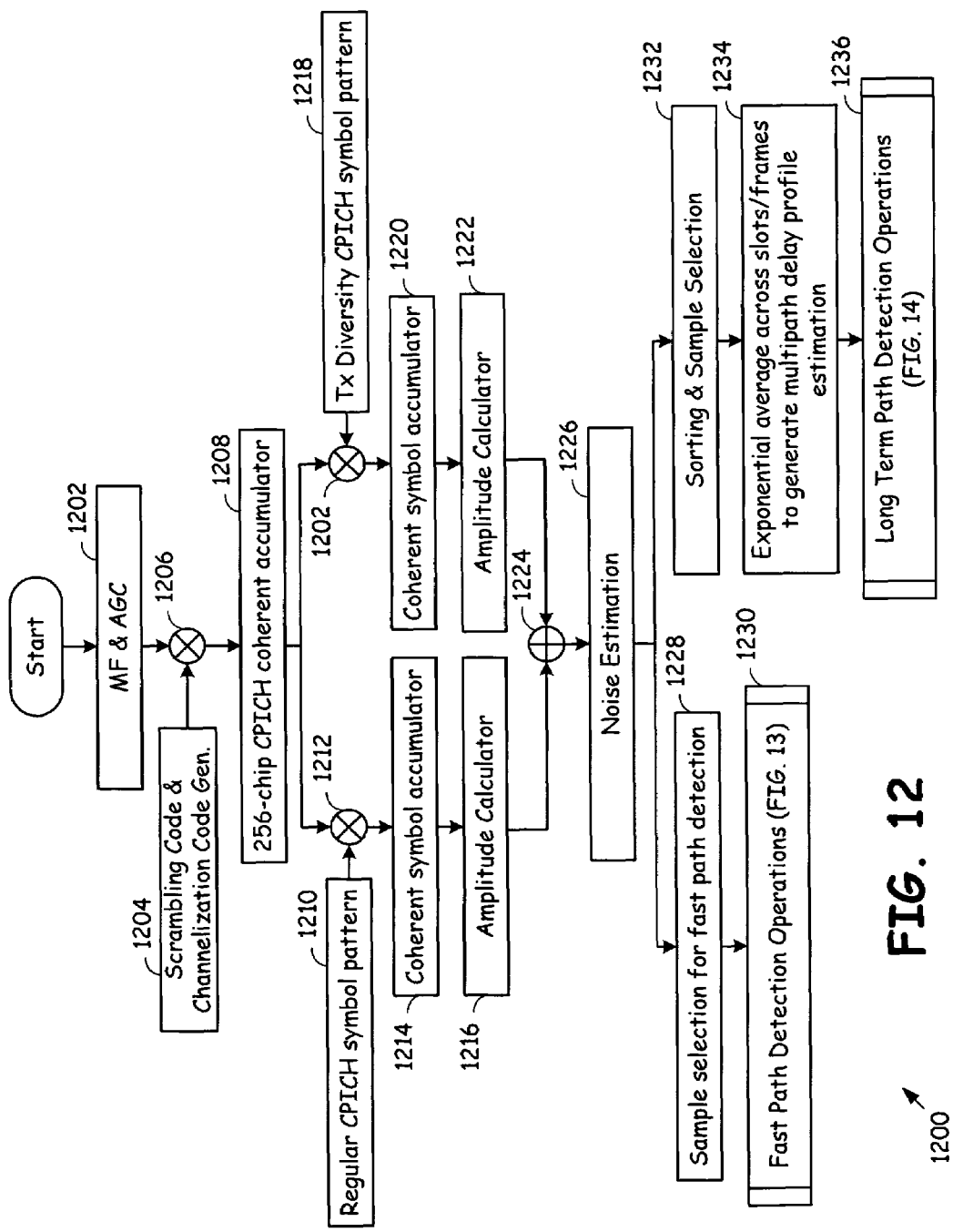
FIG. 12 is a flow chart illustrating operation of a multi-path scanner module according to an embodiment of the present invention.

FIG. 12 is a flow chart illustrating operation of a multi-path scanner module according to an embodiment of the present invention. As shown in FIG. 12, the operations of the multi-path scanner module commences with the baseband RX signal being gain controlled and frequency corrected (Step 1202). Then, the baseband RX signal is descrambled using the scrambling code and despread using the channelization code (PN sequence) at Step 1204 via multiplier 1206. The descrambled and channelized code is then accumulated (Step 1208). Accumulated symbols are then compared to the regular CPICH symbol pattern (Step 1210) via mixer 1212. Then, coherent symbol accumulation is performed (Step 1214) and the amplitude of the accumulated symbols is determined (Step 1216). Likewise, when transmit diversity operations are employed, the Tx diversity CPICH symbol pattern (Step 1218) is applied via multiplier block 1202 to the output of the 256-chip CPICH coherent accumulator at Step 1208. The result of the TX diversity CPICH symbol pattern applied signal is operated on by coherent symbol combiner (Step 1220) and the coherently combined symbols have their amplitude calculated (Step 1222). The outputs of the amplitude calculations at Step 1216 and 1222 are combined via adder 1224. The combined result is then used for noise estimation (Step 1226). The output of the noise estimation process is then operated on for sample selection for fast path detection (Step 1228). Then, fast path detection operations are performed (Step 1230). The operations at Step 1230 will be described further with reference to FIG. 13.

The output of the noise estimation operation at Step 1226 is also employed for sorting and sample selection (Step 1232) for long term path detection. Then, an exponential average across multiple slots and multiple frames is performed to generate multi-path delay profile estimation (Step 1234). Then, the long term path detection operations are performed (Step 1236). The operations at Step 1236 will be described further with reference to FIG. 14.

Figure 13:
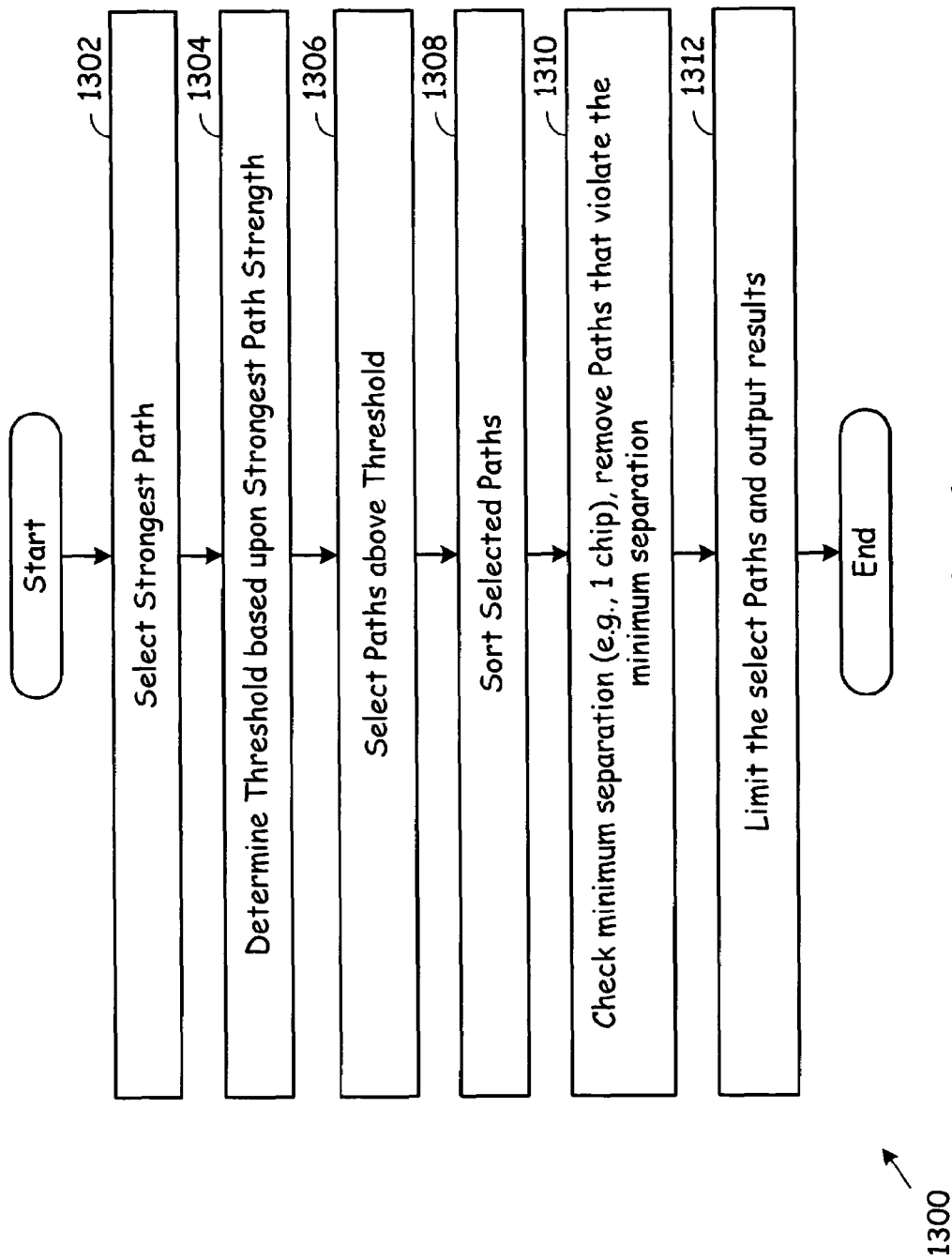
FIG. 13 is a flow chart illustrating fast path detection operations according to an embodiment of the present invention.

FIG. 13 is a flow chart illustrating fast path detection operations according to an embodiment of the present invention. Fast path detection operations 1300 commence with the fast path detection result module 1122 selecting a strongest multi-path signal components (strongest path) of the plurality of multi-path signal components determined by the multi-path scanner module 318 within the search window (Step 1302). Then, the fast path detection results module 1122 determines a threshold based upon the strongest path strength (Step 1304). Next, operation continues in selecting all paths that exceed the threshold (Step 1306). Then, those paths that have been selected that exceed the threshold are sorted (Step 1308). Of the sorted paths, minimum separation e.g., 1 chip or ½ chip among the paths are checked and those paths that violate the minimum separation are removed (Step 1310). Then, operation continues with the selected paths limited and the outputs results provided. In one embodiment, the output results are provided by the multi-path scanner module to the rake receiver combiner module which assigns rake fingers to the paths identified. Thus, when there are only a limited number of rake fingers to assign, the number of paths and the associated timing information that is passed to the rake receiver combiner module will be limited by the number of rake fingers.

Figure 14:
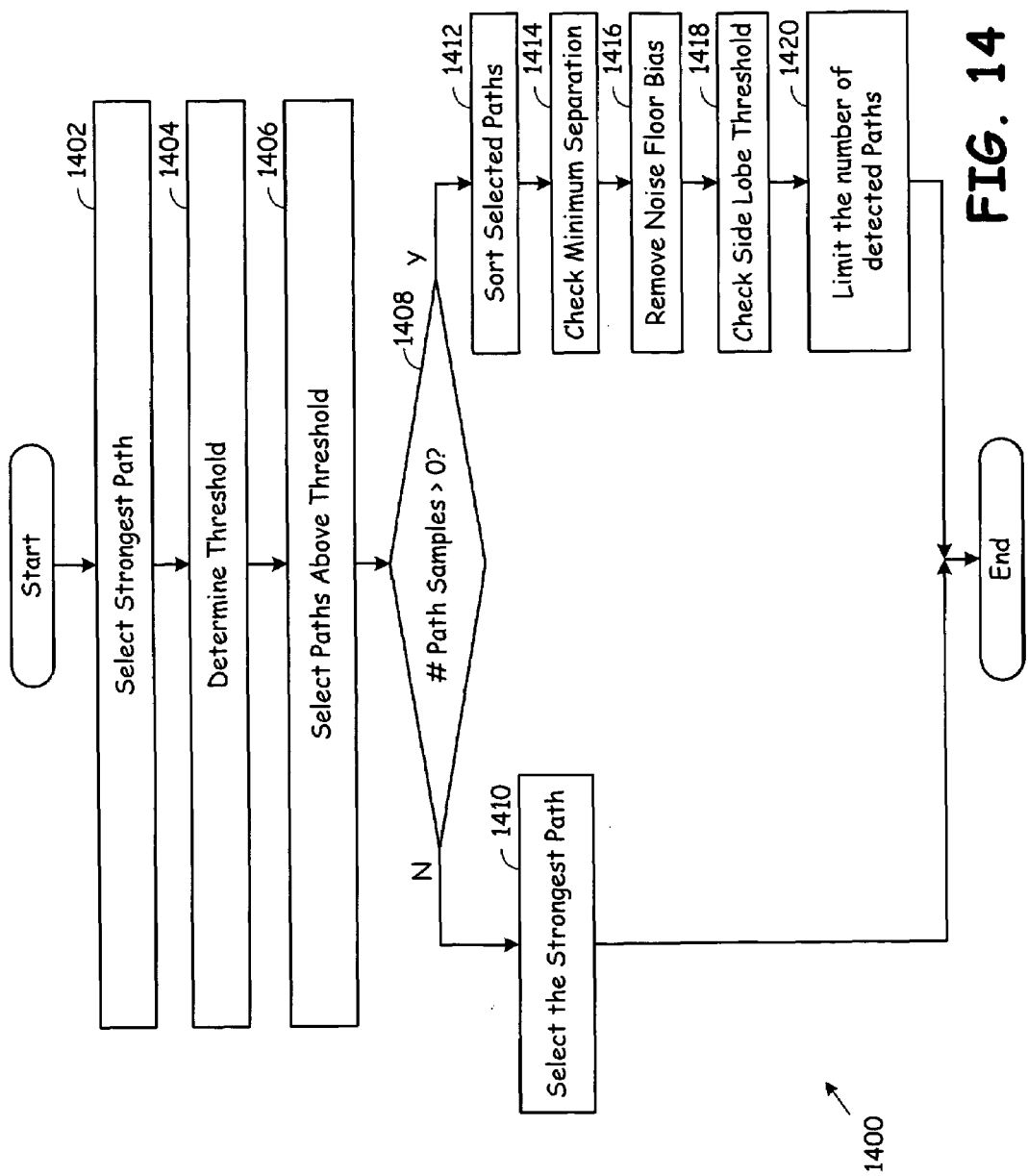
FIG. 14 is a flow chart illustrating long term path timing determination operations according to an embodiment of the present invention.

FIG. 14 is a flow chart illustrating long term path timing determination operations according to an embodiment of the present invention. Operations 1400 begin with the selection of the strongest path (Step 1402). Then, a threshold is determined based upon the strongest path (Step 1404). Then, paths having strengths that exceed the threshold are selected (Step 1406). If the number of paths selected is not above zero, the strongest path is selected (Step 1410) and operation ends. However, if the number of paths selected is greater than zero, as determined at Step 1408, the selected paths are sorted (Step 1412). Then, for the selected paths, the minimum separation among these paths is checked (Step 1414). Then, the noise floor bias is removed from the selected paths (Step 1416). Then, a side lobe threshold is checked for the selected paths (Step 1418). Then, the number of detected paths may be limited based upon the availability of fingers within a servicing rake receiver combiner module (Step 1420). From Steps 1410 and 1420, operation ends.

Figure 15:
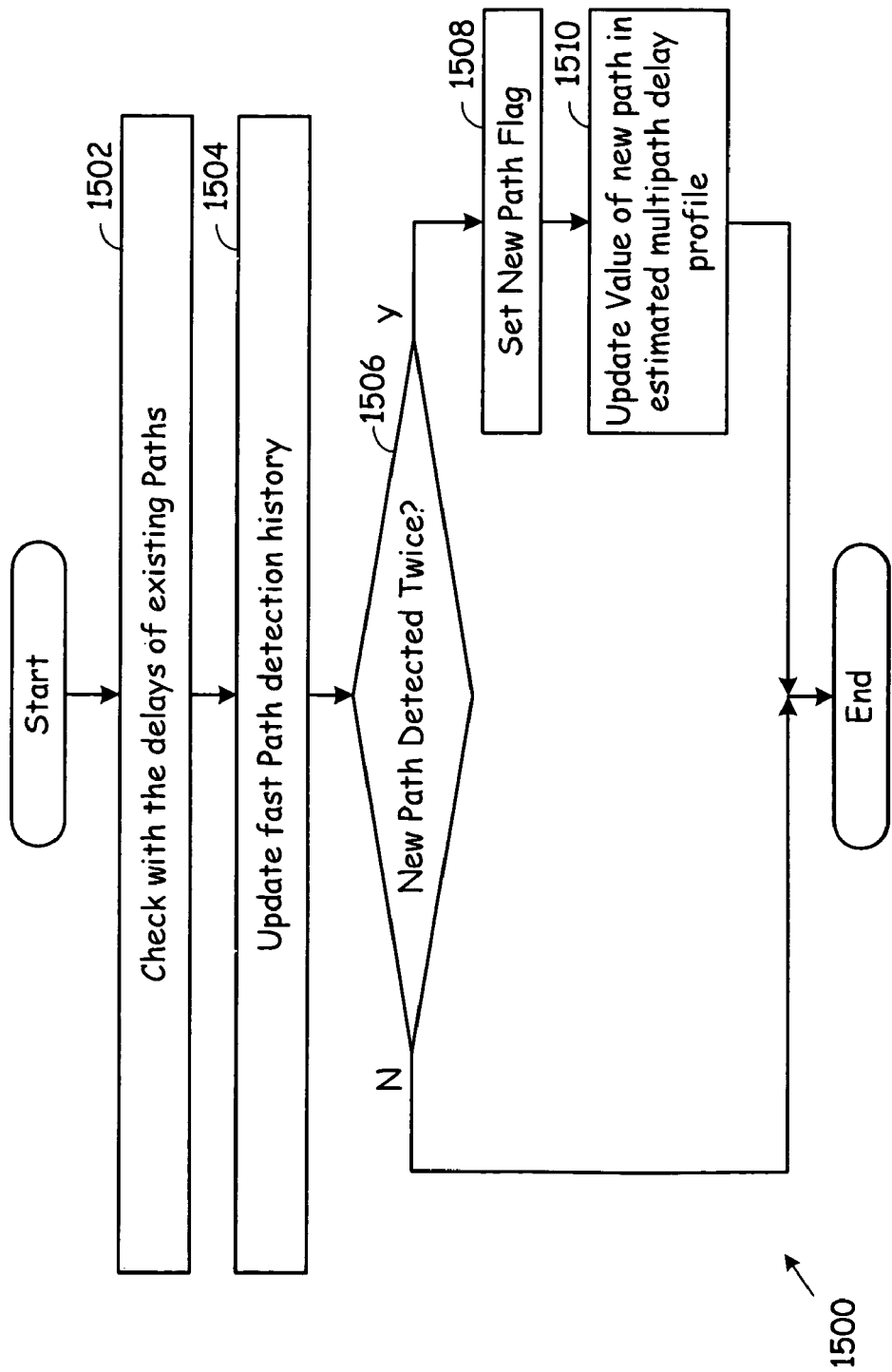
FIG. 15 is a flow chart illustrating alternate fast path timing determination operations according to an embodiment of the present invention.

FIG. 15 is a flow chart illustrating alternate fast path timing determination operations according to an embodiment of the present invention. Operation 1500 commences with checking the delays of existing paths of the WCDMA signal (Step 1502). Then, the fast path detection history is updated based upon the delays of the existing paths (Step 1504). If a new path is detected twice, as determined at Step 1506, a new path flag is set for the detected path (Step 1508). Then, an updated value from the new path is set in the estimated multi-path delay profile (Step 1510). From a negative determination at Step 1506 and from Step 1510 operation ends.

Figure 16:
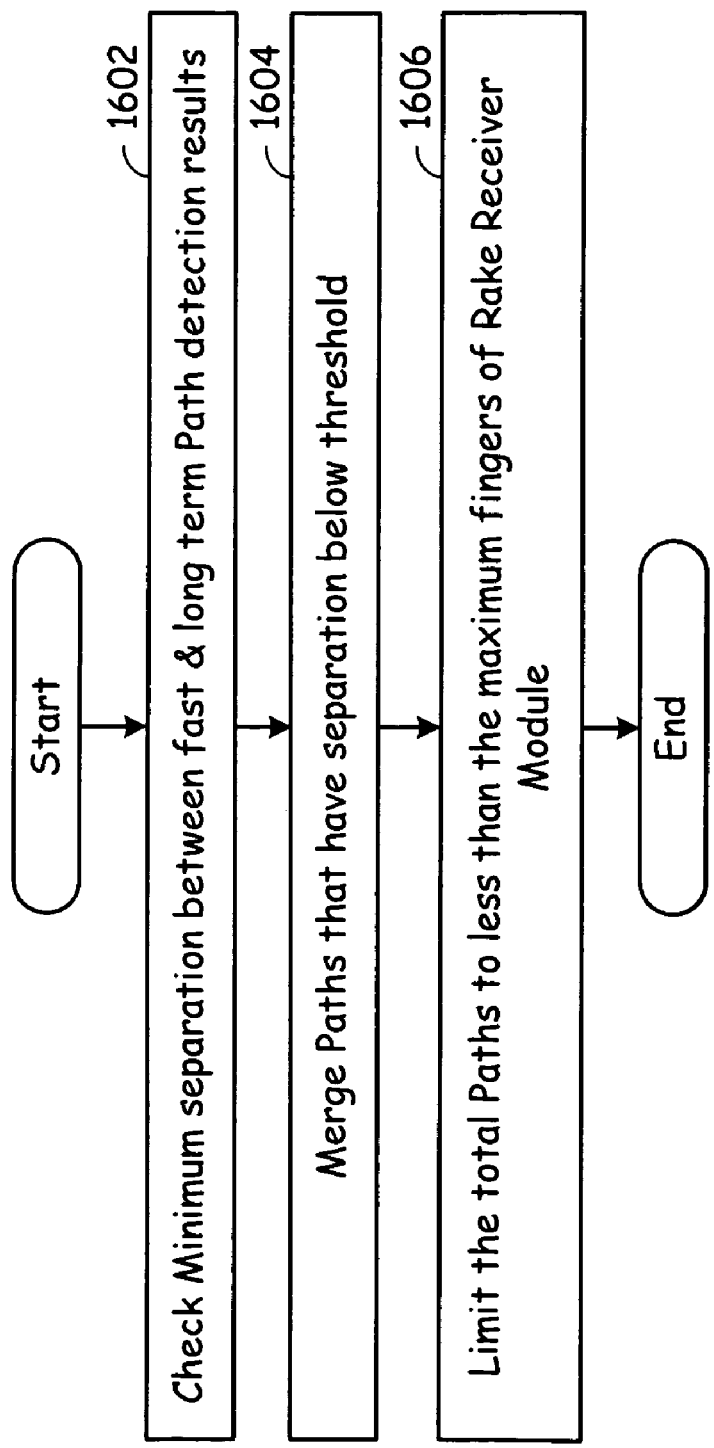
FIG. 16 is a flow chart illustrating fast path and long term path combining operations according to an embodiment of the present invention.

FIG. 16 is a flow chart illustrating fast path and long term path combining operations according to an embodiment of the present invention. The operations 1600 of FIG. 16 may be performed by the sorting and path selection module 1126 of FIG. 1A. Operation 600 commences with a check of the minimum separation between fast and long term path detection results (Step 1602). For example, referring again to FIG. 10, path 508 may have been determined in a fast path detection operation while path 510 may have been determined in a long term path detection operation. With this example, the separation between path 508 and path 510 would be compared to ensure that sufficient separation exists at Step 1602. When sufficient separation does not exist, the paths that have separation below the separation threshold are merged (Step 1604). Then, the total paths are limited to a number that is less than the maximum fingers of a servicing rake receiver combiner module (Step 1606).

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A baseband processing module for use within a Wideband Code Division Multiple Access (WCDMA) Radio Frequency (RF) transceiver, the baseband processing module comprising:
   an RX interface communicatively coupled to an RF front end of the WCDMA RF transceiver and operable to receive a baseband RX signal from the RF front end carrying a WCDMA signal; and
   a multi-path scanner module communicatively coupled to the RX interface, the multi-path scanner module operable to:

receive timing and scrambling code information regarding an expected multi-path signal component of the WCDMA signal;

establish a search window that is centered at a strongest multi-path signal component of the WCDMA signal;

identify a plurality of multi-path signal components of the WCDMA signal by descrambling, despreading, and correlating with a known symbol pattern the baseband RX signal within the search window;

determine a noise floor for the WCDMA signal within the search window;

determine timing information for the plurality of multi-path signal components of the WCDMA signal found within the search window; and remove a bias caused by the noise floor from at least one of the plurality of multi-path signal components of the WCDMA signal found within the search window; and wherein:

fast path timing information for the plurality of multi-path signal components of the WCDMA signal found within the search window is determined during a first time slot; and the multi-path scanner module is further operable to:

determine timing information for the plurality of multi-path signal components of the WCDMA signal found within the search window during a second slot time; and determine long term timing information for the plurality of multi-path signal components of the WCDMA signal based upon at least the timing information determined during the first time slot and the timing information determined during the second time slot.

2. The baseband processing module of claim 1, wherein:

a center of the search window corresponds to the expected multi-path signal component of the WCDMA signal;

the expected multi-path signal component of the WCDMA signal is the strongest multi-path signal component of the WCDMA signal; and a duration of the search window corresponds to an expected channel length.

3. The baseband processing module of claim 1, wherein the multi-path scanner module is further operable to:

determine signal strength information for each of the plurality of identified multi-path signal components of the WCDMA signal.

4. The baseband processing module of claim 1, wherein the multi-path scanner module is further operable to forward the timing information for the plurality of multi-path signal components of the WCDMA signal found within the search window to a communicatively coupled rake receiver combiner module.

5. The baseband processing module of 1, wherein:

the WCDMA RF transceiver is implemented within a cellular telephone, a laptop computer, a desktop computer, or a data terminal.

6. The baseband processing module of claim 1, wherein the multi-path scanner module is further operable to search for multi-path signal components of differing WCDMA signals in the baseband RX signal in adjacent time slots.

7. The baseband processing module of claim 1, wherein the multi-path scanner module comprises:

control logic; and a plurality of correlator elements, each correlator element operable to descramble, despread, and correlate with a known symbol pattern the baseband RX signal in alignment with a corresponding alignment position.

8. The baseband processing module of claim 1, wherein the multi-path scanner module comprises:

control logic;

at least one correlator element operable to descramble, despread, and correlate with a known symbol pattern the baseband RX signal in alignment with a corresponding alignment position;

a noise estimation module;

a fast path detection results module;

an exponential averaging module; and a sorting and path selection module.

9. The baseband processing module of claim 1, wherein the multi-path scanner module comprises a plurality of correlator elements, and each of the correlator elements includes:

correlator element control logic;

a correlator primitive module;

a pseudo noise primitive generator module; and a correlator backend primitive processing module.

10. The baseband processing module of claim 1, wherein:

the search window includes samples of the baseband RX signal corresponding to a plurality of chip intervals; and the multi-path scanner module is operable to search for multi-path signal components of the WCDMA signal corresponding to each chip interval.

11. The baseband processing module of claim 10, wherein the multi-path scanner module comprises:

control logic; and a plurality of correlator elements, each correlator element operable to descramble, despread, and correlate with a known symbol pattern the baseband RX signal in alignment with a corresponding chip interval of the plurality of chip intervals.

12. The baseband processing module of claim 1, wherein:

the search window samples of the baseband RX signal corresponding to a plurality of ½ chip intervals; and the multi-path scanner module is operable to search for multi-path signal components of the WCDMA signal corresponding to each ½ chip interval.

13. The baseband processing module of claim 12, wherein the multi-path scanner module comprises:

control logic; and a plurality of correlator elements, each correlator element operable to descramble, despread, and correlate with a known symbol pattern the baseband RX signal in alignment with a corresponding ½ chip interval of the plurality of ½ chip intervals.

14. A method for operating a Wideband Code Division Multiple Access (WCDMA) Radio Frequency (RF) transceiver comprising:

receiving a baseband RX signal that carries a WCDMA signal;

within a multi-path scanner module of the RF transceiver:

receiving timing and scrambling code information regarding an expected multi-path signal component of the WCDMA signal;

establishing a search window that is centered at a strongest multi-path signal component of the WCDMA signal;

identifying a plurality of multi-path signal components of the WCDMA signal by descrambling, despreading, and correlating with a known symbol pattern the baseband RX signal within the search window, wherein fast path timing information for the plurality of multi-path signal components of the WCDMA signal found within the search window is determined during a first time slot;

determining a noise floor for the WCDMA signal within the search window;

determining timing information for the plurality of multi-path signal components of the WCDMA signal found within the search window; and removing a bias caused by the noise floor from at least one of the plurality of multi-path signal components of the WCDMA signal found within the search window;

determining timing information for the plurality of multi-path signal components of the WCDMA signal found within the search window during a second slot time; and determining long term timing information for the plurality of multi-path signal components of the WCDMA signal based upon at least the timing information determined during the first time slot and the timing information determined during the second time slot.

15. The method of claim 14 wherein:

a center of the search window corresponds to the expected multi-path signal component of the WCDMA signal;

the expected multi-path signal component of the WCDMA signal is the strongest multi-path signal component of the WCDMA signal; and a duration of the search window corresponds to an expected channel length.

16. The method of claim 14, further comprising:

determining signal strength information for each of the plurality of identified multi-path signal components of the WCDMA signal.

\* \* \* \* \*